UNITED STATES PATENT OFFICE.

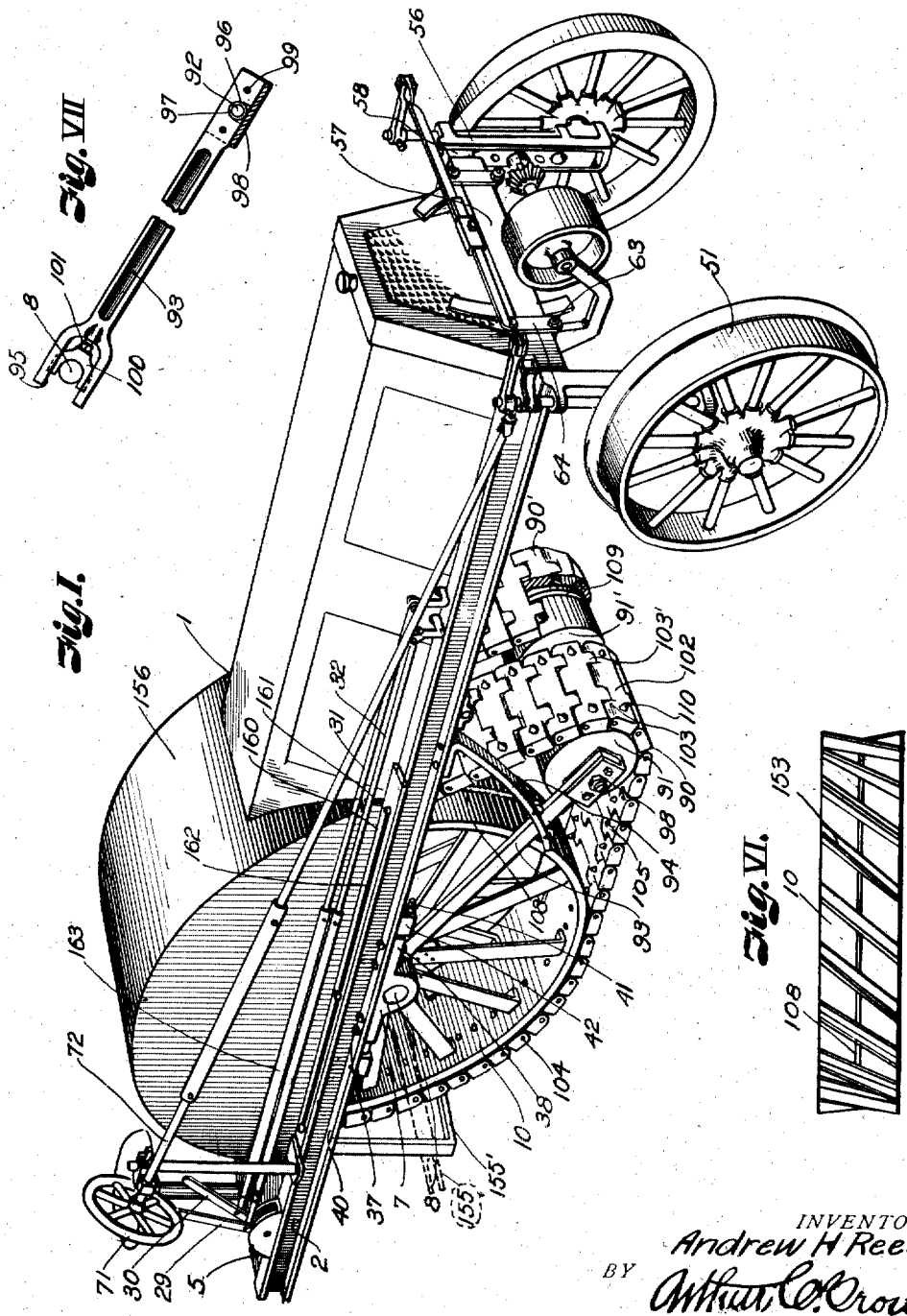

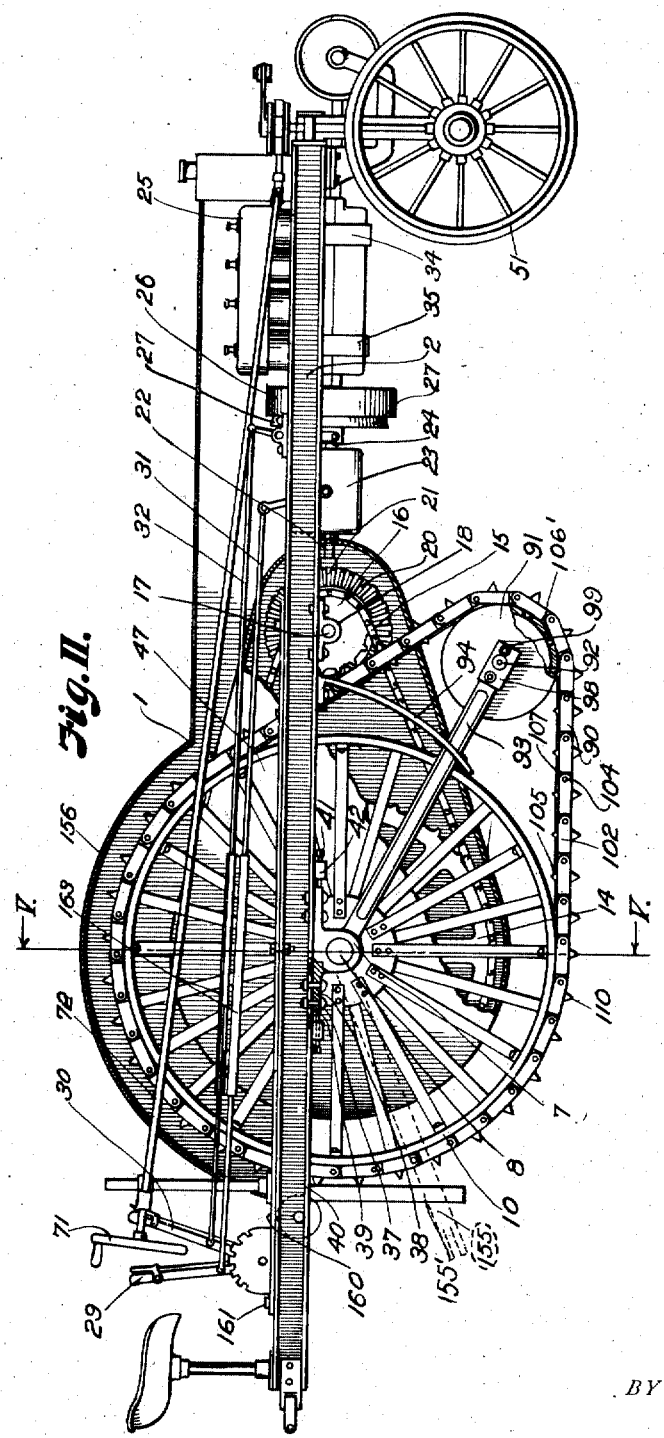

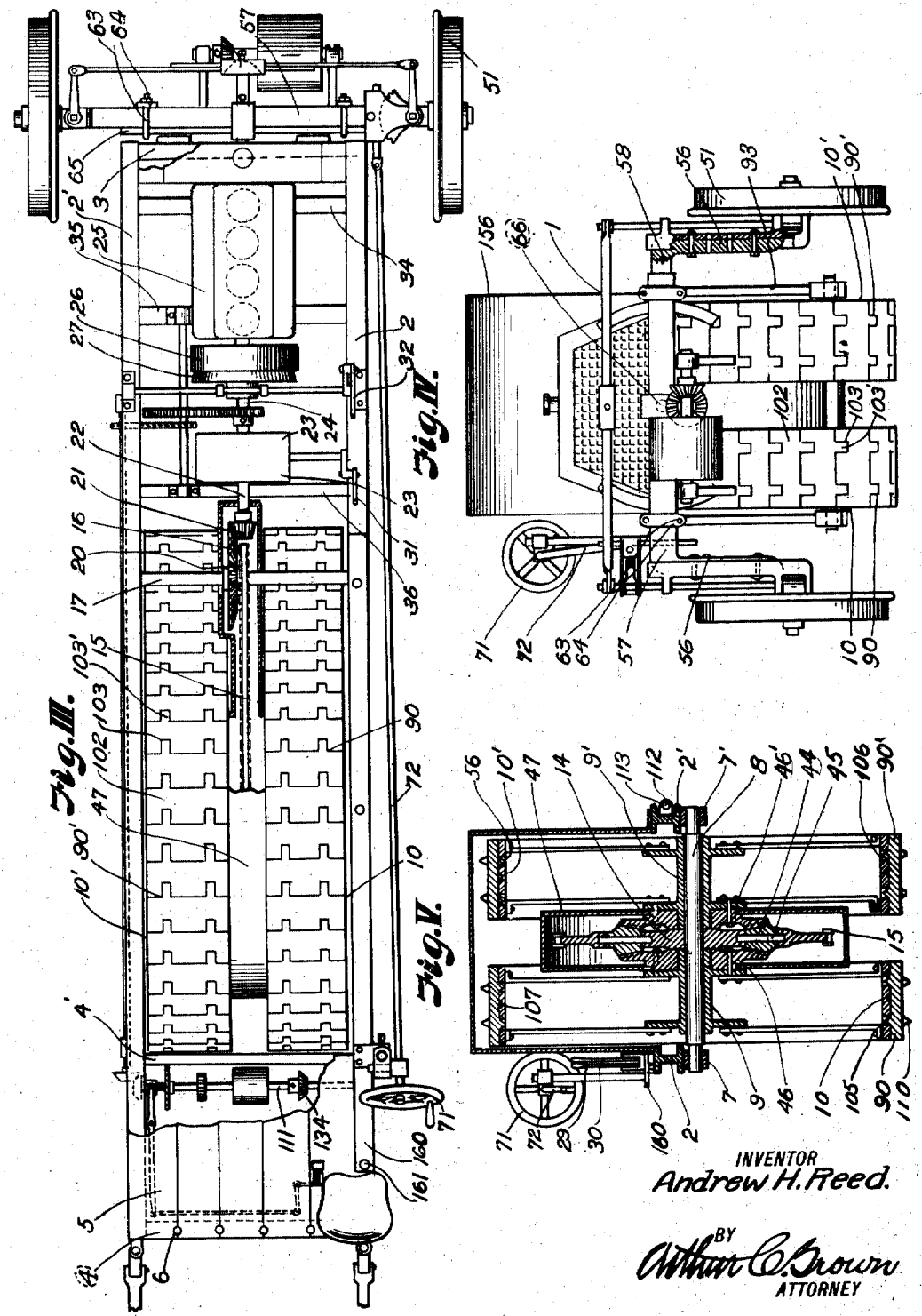

ANDREW H. REED, OF KANSAS CITY, MISSOURI, ASSIGNOR OF ONE-HALF TO H. SAHLER, OF KANSAS CITY, MISSOURI.

TRACTOR.

1,275,600.      Specification of Letters Patent.      Patented Aug. 13, 1918.

Application filed April 11, 1917. Serial No. 161,156.

*To all whom it may concern:*

Be it known that I, ANDREW H. REED, a citizen of the United States, residing at Kansas City, in the county of Jackson and State of Missouri, have invented certain new and useful Improvements in Tractors; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to tractors and more particularly to tractors of a type adapted for agricultural purposes; the principal object of the invention being to so construct and assemble the parts that the tractor provided may be successfully operated between rows of standing grain spaced at the usual distance.

A further object of the invention is to provide an endless track attachmnt which may be used when the machine is operated in marshy or very soft ground, to provide an extended bearing and traction surface that will prevent the drive wheels miring into the soil.

A further object of the invention is to provide drive and guide wheels having novel features of construction and adjustment and means for differentially transmitting power to the drive wheels.

With the foregoing objects of the invention in view and other objects which are set forth later in the specification, the invention resides in the arrangement and combination of the parts and improved details of construction hereinafter described and illustrated in the accompanying drawings, wherein:

Figure I is a perspective view of a tractor constructed according to the present invention.

Fig. II is a side elevation of the same, parts of which are broken away to illustrate the inclosed parts.

Fig. III is a plan view of the same.

Fig. IV is a front view of the tractor, particularly illustrating the mounting of the guide wheels.

Fig. V is a vertical section on the line V—V, Fig. II, showing the differential connection of the drive wheels.

Fig. VI is a plan view of a tractor wheel equipped with traction shoes which may be used on the drive wheels when the belts are removed.

Fig. VII is a detail view illustrating the mounting and adjustment of the belt and drum carrying arms.

Referring more in detail to the drawings:

1 designates a tractor constructed according to the present invention wherein the operating and driving parts are substantially mounted on a carrying frame comprising longitudinally extending side rails 2—2', preferably of I-beam construction and rigidly joined at their forward ends by a cross beam 3 and at the rear ends by spaced beams 4—4'; the latter being employed to support the driver's platform, comprising abutting plates 5 which are attached to the said beams 4—4' by bolts 6 which may be removed to permit removal of the plates and access to mechanism mounted thereunder which will presently be described.

Suspended from the frame beams 2—2' and revoluble in bearings 7—7', is a cross shaft 8 on which the hubs 9—9' of paired drive or traction wheels 10—10' are revolubly mounted. The hubs of the wheels are spaced from each other and revolubly mounted on the shaft 8, therebetween is a sprocket wheel 14 over which is run a chain belt 15, that extends over a sprocket wheel 16 fixed on a counter shaft 17 that is revolubly carried in bearings 18 mounted on the under side of the frame beams 2—2' forwardly of the bearings 7—7'.

Mounted on the shaft 17 in fixed relation to the sprocket wheel 16, is a miter-gear wheel 20 and meshing therewith is a pinion 21 carried at the end of a shaft 22 which is connected through a suitable transmission, indicated by the case 23, with the drive shaft 24 of a motor 25, that is located within the frame and is provided with the usual fly wheel 26 and clutch 27; the means for shifting the transmission gear to obtain a variation in speed of the tractor and means for operating the clutch 27 may be of any suitable nature, but is herein indicated respectively by levers 29—30 which are mounted on the platform 5 and are operatively connected with the said parts through rods 31—32. The motor control devices, such as the throttle, and spark levers are omitted from the drawings for the reason that they form no part of the present invention, but may be of any ordinary type.

In the present instance the transmission mechanism and the motor are mounted on cross beams 34—35 and 36, and are preferably suspended beneath the side beams 2—2', so as to bring the driving parts in horizontal alinement with the gear shaft 17 and to lower the heavy parts as much as possible and prevent the machine from being top heavy, so that it may be operated on ground hving maximum slope or grade.

As the present machine is driven by the chain connection, it is apparent that, due to constant strain and wear on the individual links, the chain will gradually lengthen, and it will be necessary that it be tightened from time to time. In order that such tightening may be accomplished without the removing of links from the chain, I have provided for adjusting the axle bearings 7—7' along the side rails to move the axle 8 rearwardly to produce the required tension on the chain; the means for effecting such adjustment consists in slidably fastening the bearings 7—7' to the beams 2—2', by bolts 37' which I extend through the bearing flanges 38 and through slots 39 in the beam flanges 40, and I lock the bearings at an adjusted position by means of set screws 41 which are threaded through lugs 42, at opposite sides of the bearings 7—7' to engage the ends of the flange portions 38, so that by proper adjustment of the screws the bearings may be moved and locked at a position to produce the necessary tension on the chain belt.

To permit the tractor to turn in a minimum amount of space, I provide the drive wheels with a differential driving connection whereby the wheels may revolve at different speeds while the tractor turns, and at the same time both may be driven by the engine according to the resistance against the traction surface. The differential may be of any preferred type but in the present device, comprises the sprocket wheel 14 which is revoluble on the shaft 8 and carries bevel pinions 44 on shaft 45 mounted in radial alinement with the shaft 8 within the wheel 14; the said pinions meshing with inwardly facing bevel gear wheels 46—46' that are fixed to the hubs 9—9' of the drive wheels. With this means of connection, it will be seen that as the tractor travels on a straight line there will be no relative movement of the gears 46—46', but when the tractor turns to either side, the outside wheel is permitted, by the compensating gears 44, to revolve faster than the inside wheel while at the same time both are being driven from the engine.

In order to keep dust, dirt, moisture, etc., from the driving chains and differential gearing parts, I inclose the same in a casing 47, preferably of light substantial sheet metal so that no unnecessary weight is added to the machine.

The forward end of the tractor is supported by the guide wheels 51 which are steerably mounted on the end members 56 of laterally telescoping axle members 57—58 which are fixed by U-bolts 63 and clamp plates 64 at an adjusted position to a bar 65 which is pivotally mounted by a pin 66 extending centrally from a cross beam at the forward end of the frame to provide pivotal support for the frame at its forward end. The wheels are steered by means of a wheel 71 suitably mounted at the rear of the tractor and which is connected with the guide wheels through a steering rod 72 that simultaneously actuates both wheels.

To adapt the tractor for use on marshy or soft ground, I provide the drive wheels with traction belts 90—90' which are adapted to run on the wheels 10—10' and over drums 91—91' revolubly mounted on a cross shaft 92 carried at the free ends of arms 93 pivotally mounted on the axle 8 adjacent the bearings 7—7'; the said arms being urged downwardly by springs 94 which are attached to the beams 2—2' and bear against the said arms to urge the track belt against the ground to provide the additional traction.

To provide for easy removal of the traction belts from the machine, I provide the carrying arms 93 at their mounting ends with open end sockets 95 which are adapted to receive the shaft 8 therein, and at the outer ends of said arms, I provide sockets 96 which are adapted to seat over bearing collars 97 carried in U-shaped plates 98 wherein the ends of the shaft 92 are mounted and within which the ends of the arms 93 may be fastened by bolts 99. To remove the belts from the wheels, the arms 93 are released from the bearing plates 98 by removing the bolts 99, and may then be withdrawn from the axle 8. The belts are then separated by the removal of a bolt from the links presently described, and may be taken from the wheels.

To provide for tightening the belts when in use, I locate open bearings 100 slidably in the end sockets 95 of the arms 93 and insert set screws 101 in the bases of the sockets which may be threaded in or out to adjust the bearings in the socket and give the required tension on the belt.

The preferred construction of the track belt 90—90', comprises transverse links 102 provided at their longitudinal edges with sockets 103 for receiving ears 103' extended from the opposite edges of adjoining links, and the said links are pivotally connected by cross bolts 104. The inner face of each link is also provided with inwardly projecting lugs 105, which are adapted to seat, as the wheel revolves, in sockets 106 in the face of the wheels 10—10', and in sockets 106' in the tensioning drums so that slipping of the track belts on the drive wheels is prevented.

Each link is also provided with a transverse rib 107 which is adapted to register with grooves 108—109 in the drive wheel and drums respectively, to retain the tracks in functional position on the wheels, and to give additional traction to the track belts I also provide the outer faces of the links with lugs 110 similar to those on the inner faces, which are adapted to grip the ground surfaces as the links are successively brought in contact therewith.

While I have shown the tractor equipped with the endless track members it is the intention that when such are not needed they may be removed and traction shoes 153 attached to the wheels as is illustrated in Fig. VI. It is also intended, when the tractor is used for pushing a header or the like, that the arms 93 be reversed to extend rearwardly so that the traction belts will engage the ground back of instead of ahead of the ground wheels.

I also provide a yoke 155 which may be attached to the axle 8 after the arms 93 are removed and by which plows or their like may be drawn; the said yoke being held against lateral movement at its rear end between hanger arms 155' suspended beneath the frame.

To prevent dust or weather from injuring the operating parts of the machine, I prefer to cover the same with a hood 156 which extends from the rear to the front of the machine to inclose the drive wheels, the engine and intermediate machinery.

In order that the tractor may be operated by a person seated on a drawn machine, I mount the operating levers 29—30 and steering mechanism on a beam 160, which is adjustably attached to the beam 2 by means of bolts 161 extended through the beam flange and longitudinally extending slots 162 in the beam 160 and which may be loosened so that the beam 160 may be extended rearwardly from the tractor frame to bring the motor and steering parts to a position accessible to the operator; adjustment of the rods 31—32 and steering rod 72, is effected by telescoping the latter in tubes 163.

With the tractor constructed as described, it is apparent that various harvesting or ground working implements may be attached or drawn thereby and if necessary, the driver may operate the engine from the drawn implement by extending the operating and guide rods rearwardly; this being made possible by the adjustable feature in the said rods and by moving the plate which carries the standard and levers rearwardly on the platform to a position accessible to the operator when he is seated on the drawn machine.

It is also apparent that the endless track arrangement will permit the use of the machine in fields of soft or wet ground where the ordinary tractor could not be used, thereby preventing the delay of grain harvesting due to such conditions of the field.

It is also apparent that when the endless track is not needed it may be removed and the wheels provided, if necessary, with grip shoes as illustrated in Fig. VI, and used as the ordinary farm tractor.

While only certain specific uses of the tractor have been referred to, I do not wish to limit myself to those mentioned, as it is apparent that the implement is adapted for various uses.

Having thus described my invention, what I claim as new therein, and desire to secure by Letters-Patent, is:

1. In a tractor, the combination with a suitable frame, of an axle mounted on the frame, drive wheels revolubly mounted in spaced relation on the axle, a differential drive mechanism revolubly mounted on said axle intermediate the drive wheels and operatively connecting the same, arms pivotally supported from said axle exteriorly of said drive wheels, a transverse axle mounted in the free ends of said arms, belt wheels revolubly mounted on said axle in alinement with said drive wheels, endless traction belts operating over said paired drive and belt wheels and presenting extended traction surfaces, and means for yieldingly resisting lifting of the belt wheels.

2. In a tractor, the combination with a suitable frame, of an axle mounted on the frame, drive wheels revolubly mounted in spaced relation on the axle, a differential drive mechanism revolubly mounted on said axle intermediate the drive wheels and operatively connecting the same, arms pivotally supported from said axle exteriorly of said drive wheels, and adapted to extend either rearwardly or forwardly thereof, a transverse axle carried by the free ends of said arms, belt wheels revolubly mounted on the said axle in paired alinement with the drive wheels, and normally resting on the same horizontal plane, traction belts operating over said paired belt, and drive wheels to present an extended traction surface, and means for yieldingly resisting upward movement of said belt wheels.

3. In a tractor, the combination with a suitable frame, of an axle mounted on the frame, drive wheels revolubly mounted in spaced relation on the axle, a differential drive mechanism revolubly mounted on said axle intermediate the drive wheels and operatively connecting the same, arms pivotally supported from said axle exteriorly of said drive wheels and adapted to extend either rearwardly or forwardly thereof, a transverse axle carried by the free ends of said arms, belt wheels revolubly mounted on the said axle in paired alinement with the drive wheels, and normally resting on the same horizontal plane, traction belts operating over said paired belt, and drive wheels to present an extended traction surface, means for yieldingly resisting upward movement of said belt wheels, and means for adjusting the radial length of said arms to adjust the tension of said belts.

4. In a tractor, the combination with a suitable frame of an axle mounted on the frame, ground wheels mounted in spaced relation on the axle, a differential drive mechanism revolubly mounted on said axle intermediate the ground wheels and operatively connecting the same, arms pivotally supported from said axle and adapted to extend either rearwardly or forwardly thereof and having yoke portions at their inner ends, bearing members slidably mounted within the yoke portions of said arms for receiving said axle and adjustable within the yoke portions to determine the radial length of said arms, a transverse axle mounted at the free ends of said arms, belt wheels revolubly mounted on the said axle in paired alinement with the ground wheels and traction belts operating over said paired belts and ground wheels to prevent extended traction surfaces, for the purpose set forth.

5. In a tractor the combination with a suitable frame of an axle mounted transversely across the frame and adjustable longitudinally therealong, ground wheels mounted in spaced relation on said axle, means for differentially driving said ground wheels, removable arms pivotally supported from said axle at opposite sides of said ground wheels and adapted to extend either rearwardly or forwardly thereof and having yoke portions at their inner ends, bearing members slidably mounted within said yoke portions of said arms for receiving said axle and adjustable therein to determine the radial length of said arms, a transverse axle removably supported by the free ends of said arms, belt wheels revolubly mounted on the said axle in paired alinement with the ground wheels, traction belts operating over said paired ground and belt wheels and means fixed to the frame for yieldingly resisting upward movement of the belt wheels.

In testimony whereof I affix my signature.

ANDREW H. REED.